No. 757,437. PATENTED APR. 19, 1904.
G. E. BROWN.
PAD OR TREE PROTECTOR.
APPLICATION FILED DEC. 18, 1903.
NO MODEL.
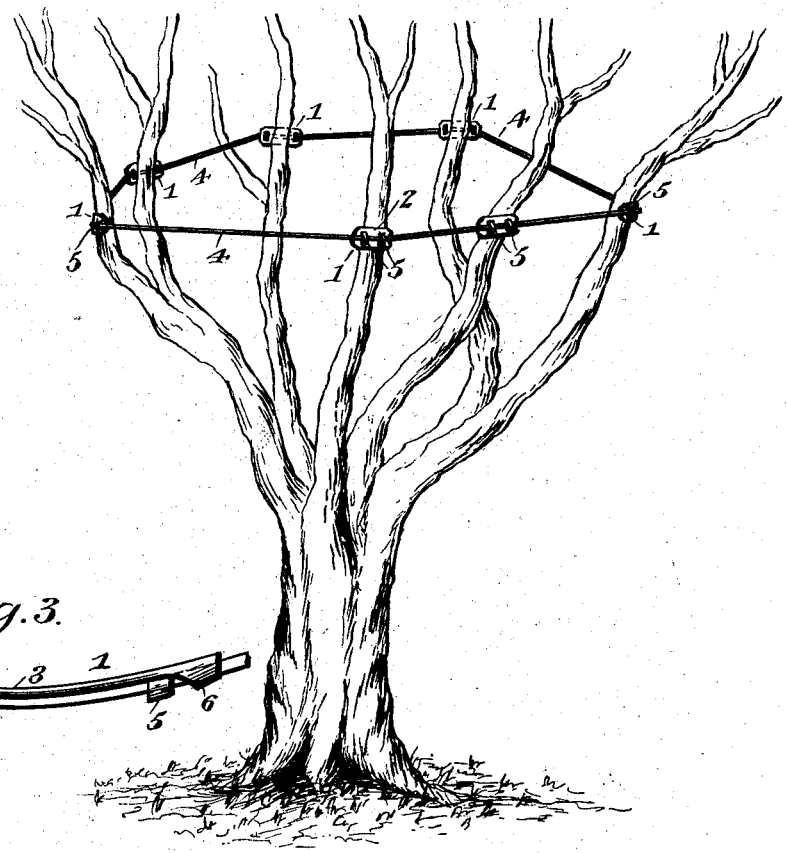
Fig. 1.
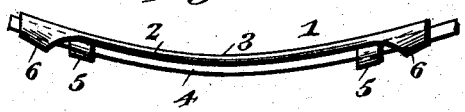
Fig. 3.
Fig. 2. Fig. 6. Fig. 7.
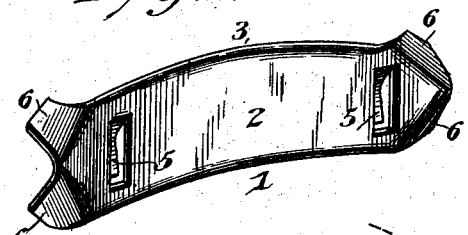 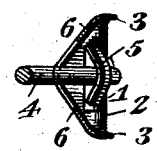 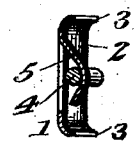
Fig. 4.
Fig. 5.
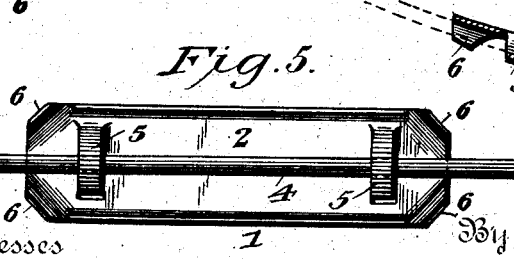
George E. Brown,
Inventor
Witnesses No. 757,437. Patented April 19, 1904.

UNITED STATES PATENT OFFICE.

GEORGE E. BROWN, OF SELMA, CALIFORNIA, ASSIGNOR OF ONE-HALF TO J. H. WRIGHT, JR., OF SELMA, CALIFORNIA.

PAD OR TREE-PROTECTOR.

SPECIFICATION forming part of Letters Patent No. 757,437, dated April 19, 1904.

Application filed December 18, 1903. Serial No. 185,716. (No model.)

*To all whom it may concern:*

Be it known that I, GEORGE E. BROWN, a citizen of the United States, residing at Selma, in the county of Fresno and State of California, have invented a new and useful Pad or Tree-Protector, of which the following is a specification.

The invention relates to a tree pad or protector.

The object of the present invention is to provide a simple, inexpensive, and efficient device adapted when a tree is tied up with a rope or wire to be interposed between such rope or wire and the limbs to prevent the former from cutting into and injuring the latter.

A further object of the invention is to provide a device of this character adapted to be readily applied to a rope or wire and capable of sliding or moving thereon, whereby it may be readily arranged in proper position for protecting a limb.

Another object of the invention is to provide a pad or protector capable of being applied to a wire or rope after the same has been placed around a tree for supporting the limbs thereof and adapted to engage such wire or rope, whereby it is effectively prevented from accidentally slipping from under the same.

With these and other objects in view the invention consists in the novel construction and arrangement of parts hereinafter fully described, illustrated in the accompanying drawings, and pointed out in the claims hereto appended, it being understood that various changes in the form, proportion, size, and minor details of construction within the scope of the appended claims may be made without departing from the spirit or sacrificing any of the advantages of the invention.

In the drawings, Figure 1 is a perspective view showing the pad or protector applied to a tree. Fig. 2 is a detail perspective view of the tree pad or protector. Fig. 3 is an edge view showing the same applied to a wire. Fig. 4 is a longitudinal sectional view of the same, the wire being shown in dotted lines. Fig. 5 is an elevation of the tree pad or protector, the parts being arranged as illustrated in Fig. 3. Figs. 6 and 7 are detail views of portions of the tree pad or protector, illustrating the construction of the transverse wire-engaging tongues.

1 designates a tree pad or protector constructed of galvanized sheet-iron or other suitable material, and consists, essentially, of an oblong piece or plate curved longitudinally to present a slightly-concaved inner face 2 to a limb to conform generally to the configuration thereof. The side edges 3 are bent outward, as clearly shown in Figs. 6 and 7 of the drawings, to present beveled or angularly-disposed side faces for preventing the pad or protector from cutting the bark of a tree.

The tree pad or protector is especially designed to be applied to a tree, as illustrated in Fig. 1 of the drawings, the limbs being tied up by an encircling wire 4 for supporting the same to prevent them from breaking down when loaded with fruit. The device, however, is adapted to be applied to ornamental trees and plants to prevent a wire, rope, or the like from injuring the same.

The pad or protector is applied to a tree after the limbs have been tied up, and it is retained on the encircling wire by a pair of transversely-disposed tongues 5, struck from the plate or body of the pad or protector and formed by parallel slits or cuts connected at one end, the partially-severed metal being bent outward and being adapted to be bent around the wire or rope, as clearly shown in Figs. 6 and 7. Any desired number of tongues may be provided; but two will be found ample, and they are preferably located adjacent to the ends of the plate, as shown. The corners 6 of the plate are bent outward slightly to provide projecting portions, which are arranged in pairs at the ends of the pad or protector and which are located at opposite sides of the wire, whereby the pad or protector is effectively prevented from slipping upward or downward. The wire lies in the intervening space or groove between the projecting corner portions, which coöperate with the transversely-disposed tongues for retaining the pad or protector on the wire.

The tree pad or protector besides preventing the wire or cord from cutting into a limb also presents a broad rounded bearing-face to the same, whereby the limb is prevented from breaking.

It will be seen that the device is exceedingly simple and inexpensive in construction, that it is capable of being readily applied to a tree, and that the means for securing it to a wire or other flexible connection permit it to slide on such wire and at the same time prevent it from slipping upward or downward.

What I claim as new, and desire to secure by Letters Patent, is—

1. A tree pad or protector designed to be interposed between a limb and an encircling flexible connection, said tree-pad being curved to present a concaved face to the limb and provided with transversely-disposed exteriorly-arranged tongues for engaging the flexible connection, substantially as described.

2. A tree pad or protector designed to be interposed between a limb, and an encircling flexible connection to prevent the latter from cutting into the limb, said tree pad or protector being provided with a transversely-disposed tongue for engaging the flexible connection, and having projections at opposite sides of the latter to prevent the tree pad or protector from slipping, substantially as described.

3. A tree pad or protector designed to be interposed between a limb, and an encircling flexible connection to prevent the latter from cutting into the limb, said tree pad or protector being provided with a transversely-disposed tongue for engaging the flexible connection, and having its corners bent outward to form projecting portions, substantially as described.

4. A tree pad or protector designed to be interposed between a limb, and an encircling flexible connection to prevent the latter from cutting into the limb, said tree pad or protector consisting of a curved plate provided with transverse tongues for engaging the flexible connection, and having the corners at each end bent outward to provide opposite projecting portions, substantially as described.

In testimony that I claim the foregoing as my own I have hereto affixed my signature in the presence of two witnesses.

GEORGE E. BROWN.

Witnesses:
JOHN C. RORDEN,
E. P. TODD.